(No Model.)
I. KITSEE.
DRY VOLTAIC BATTERY.
No. 395,706. Patented Jan. 8, 1889.
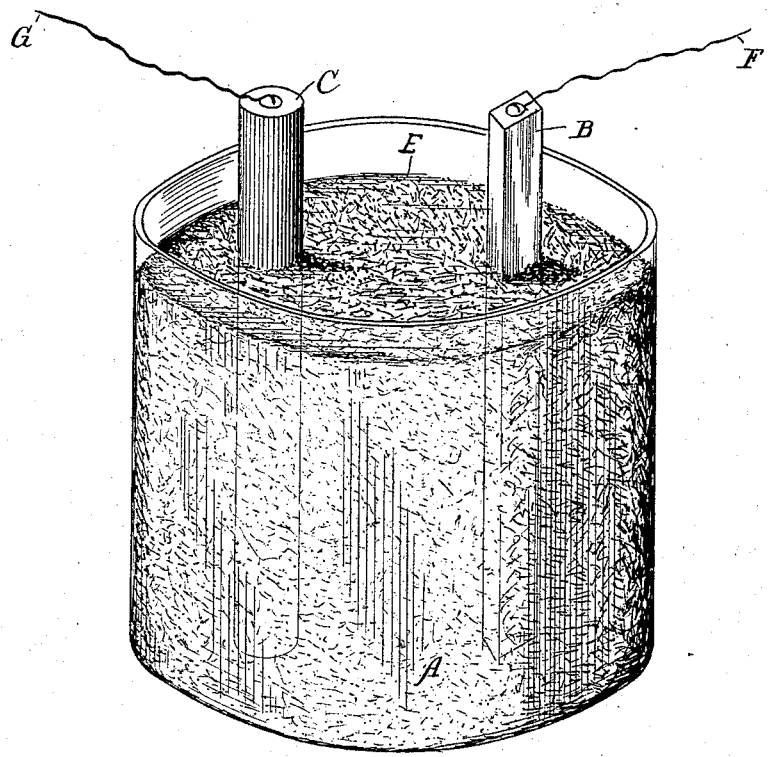
WITNESSES,
Rob B. Shephud.
J. Norman Dixon.
Isidor Kitsee,
INVENTOR.
By his Attorneys,
J. C. Frauchust.
J. Bonsall Taylor

UNITED STATES PATENT OFFICE.

ISIDOR KITSEE, OF CINCINNATI, OHIO.

DRY VOLTAIC BATTERY.

SPECIFICATION forming part of Letters Patent No. 395,706, dated January 8, 1889.

Application filed April 19, 1888. Serial No. 271,209. (No specimens.)

*To all whom it may concern:*

Be it known that I, ISIDOR KITSEE, of the city of Cincinnati, and State of Ohio, have invented an Improvement in Dry Voltaic Batteries, of which the following is a specification.

My invention relates to dry voltaic cells of any form and is hereinafter described and claimed.

In the accompanying drawing a dry voltaic cell of a usual and well known construction is represented. This cell is composed of a wooden or other containing vessel A, zinc and carbon elements B and C, and a battery compound E packed between, and in contact with, said battery elements. F and G are the circuit wires leading respectively from the zinc and carbon poles.

I have discovered that chloride of ammonia, or chloride of soda, or an equivalent chloride compound, bisulphate of mercury, and glycerine, when properly mixed and mechanically held together, form a compound which possesses many advantages for charging dry voltaic cells. In the formation from the materials named of a dry battery I obtain good results by making a saturated solution of chloride of ammonia by dissolving the same in water and adding thereto a quantity of crystals of bisulphate of mercury not exceeding one fourth by weight of the ammonia employed. To this saturated solution of chloride of ammonia I add a quantity of glycerine equal to five per cent by weight of the water employed in making said saturated solution. I then saturate pieces of asbestus with the chloride of ammonia, bisulphate of mercury, and glycerine compound thus formed, and pack the saturated asbestus between and around the positive and negative plates or elements of the battery. This having been done, I attach conducting wires to the said positive and negative elements, and complete the closure of the containing box of the battery in any suitable manner. If bisulphate of mercury were not present in said battery compound the oxygen would be liberated, hydrogen would collect upon the surface, and in the pores of, and polarize, the carbon element. The polarization of the carbon element is prevented by the presence of bisulphate of mercury which causes the oxygen of the chloride of ammonia and bisulphate of mercury compound to combine with the liberated hydrogen of said compound, and form water, and prevent the deposition of hydrogen gas upon the negative element of the battery. The office of the glycerine is to indefinitely maintain sufficient moisture in the battery, to cause the substances of the battery compound to freely act, chemically, to sustain the action of the battery.

I do not confine myself to the exact proportions of chloride of ammonia, bisulphate of mercury, and glycerine above described, as it will be understood that the proportions named may be varied without departing from my invention.

Having thus described my invention, I claim—

1. A battery compound for a dry voltaic cell consisting of chloride of ammonia, or an equivalent chloride compound, bisulphate of mercury, and glycerine.

2. In a dry voltaic cell, in combination, a containing vessel, positive and negative elements contained therein, and a battery compound consisting of chloride of ammonia, or an equivalent chloride compound, bisulphate of mercury, and glycerine, contained within said vessel and in contact with said elements, as specified.

In testimony that I claim the foregoing as my invention I have hereunto signed my name this 2d day of April, A. D. 1888.

ISIDOR KITSEE.

In presence of—
WM. C. STRAWBRIDGE,
F. NORMAN DIXON.